United States Patent [19]

Morishima et al.

[11] Patent Number: 5,797,263
[45] Date of Patent: Aug. 25, 1998

[54] EXHAUST EMISSION CONTROL APPARATUS

[75] Inventors: Shingo Morishima, Nukata-gun; Jun Yamada, Okazaki; Kenji Kanehara, Toyohashi; Tohru Yoshinaga, Okazaki, all of Japan

[73] Assignee: Nippon Soken, Inc., Nishio, Japan

[21] Appl. No.: 598,176

[22] Filed: Feb. 7, 1996

[30] Foreign Application Priority Data

Feb. 8, 1995 [JP] Japan ................... 7-020544

[51] Int. Cl.$^6$ ........................................ F01N 3/02
[52] U.S. Cl. ......................... 60/311; 60/297; 60/302
[58] Field of Search ........................ 60/302, 311, 297

[56] References Cited

U.S. PATENT DOCUMENTS 5,493,859  2/1996  Shinohara ......................... 60/311

FOREIGN PATENT DOCUMENTS 6-212951  8/1994  Japan .

Primary Examiner—Douglas Hart
Attorney, Agent, or Firm—Cushman Darby & Cushman IP Group of Pillsbury Madison & Sutro LLP

[57] ABSTRACT

The exhaust emission containing large and small particles, discharged from an exhaust port of a cylinder No. 1 of an engine during a first exhaust stroke collides with a first adsorbent opposed to the exhaust port, so that some of the small particles of HC enter a connecting gas passage. Since the latter is not connected to a second adsorbent for a cylinder No. 3 in which a second exhaust stroke consecutively occurs, the exhaust gas discharged from the first cylinder can be easily introduced in the first adsorbent and in the connecting gas passage. When the cylinder No. 4 changes to an exhaust stroke, the exhaust gas discharged therefrom is introduced in the connecting gas passage through the corresponding adsorbent to move the HC remaining in the connecting gas passage toward the first adsorbent. Thus, the HC is adsorbed again by the first adsorbent and little is discharged into the air. Consequently, the HC adsorbing efficiency can be enhanced.

5 Claims, 8 Drawing Sheets

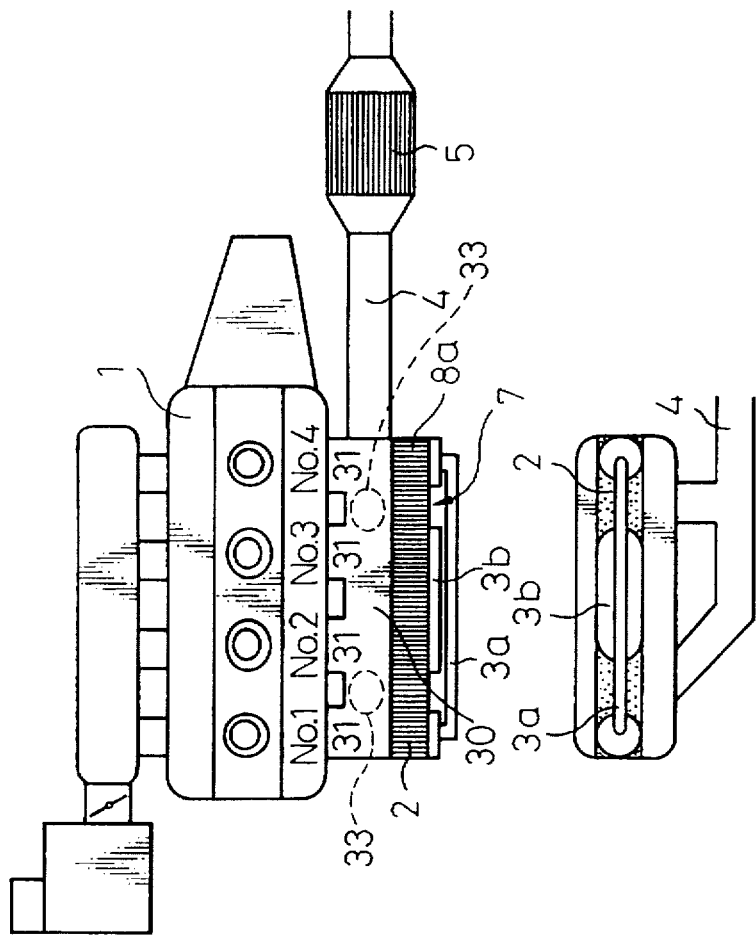

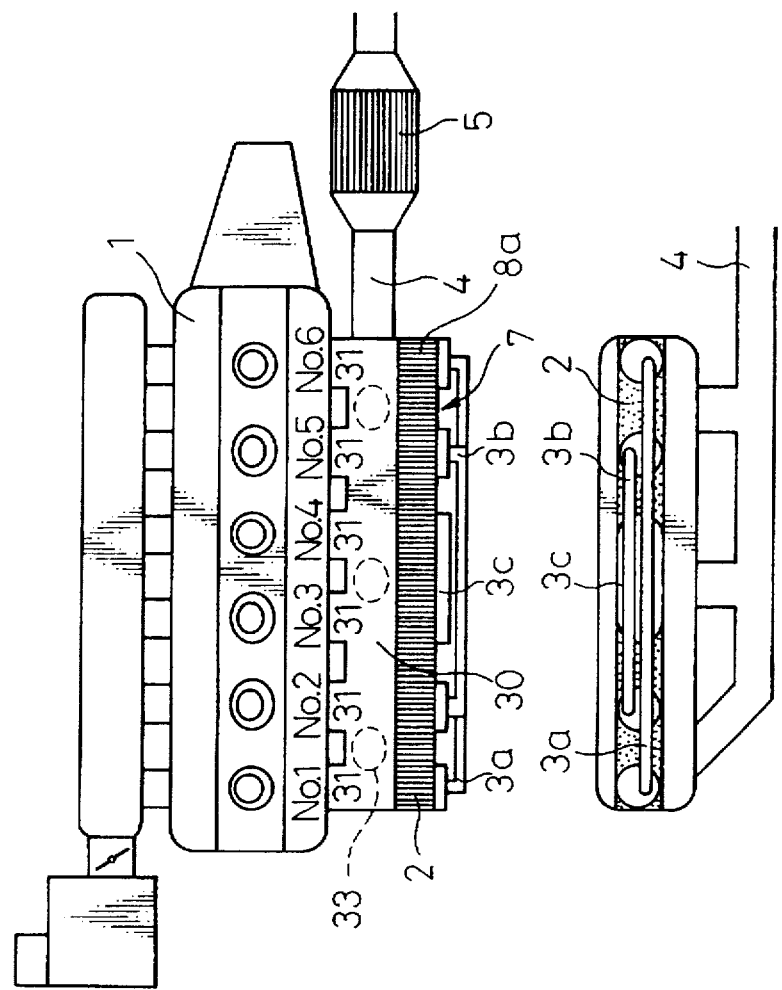

Fig.4A
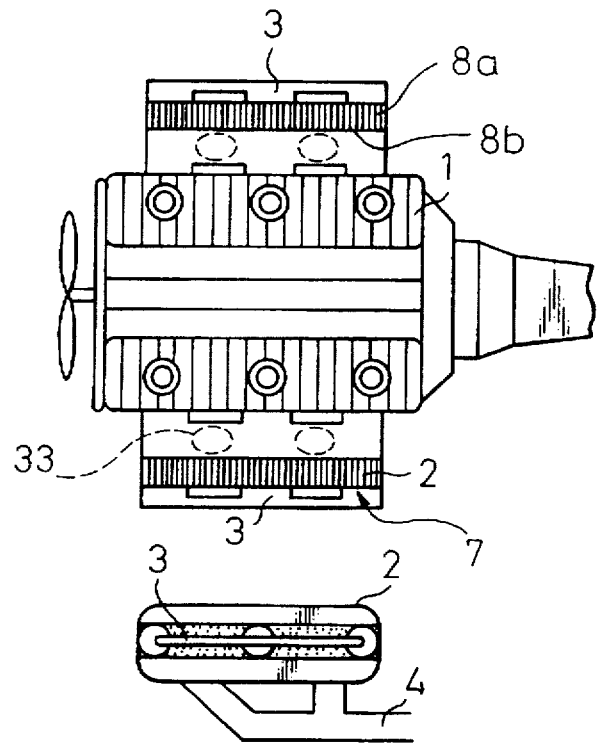
Fig.4B
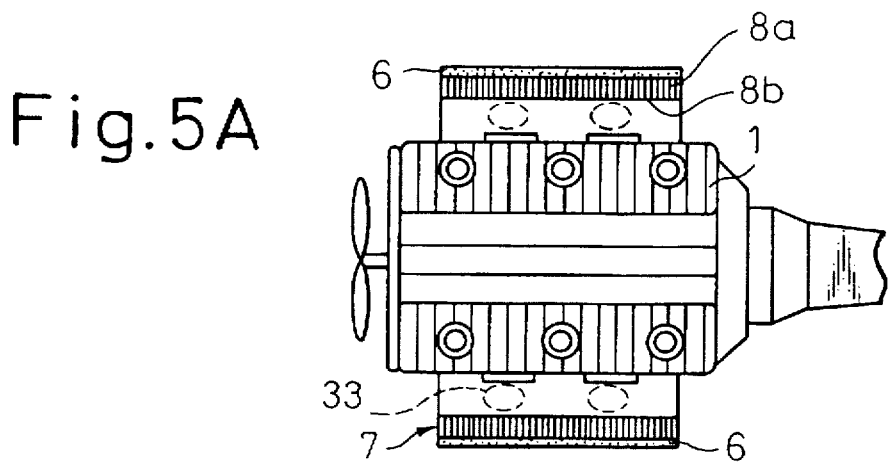
Fig.5A

EXHAUST EMISSION CONTROL APPARATUS

BACKGROUND OF THE INVENTION

1. Field of the invention

The present invention relates to an exhaust emission control apparatus to remove harmful substances discharged from an internal combustion engine.

2. Description of the Related Art

In a conventional exhaust emission control apparatus, an HC (hydrocarbon) adsorbent is opposed to an exhaust port of a gasoline engine to trap and adsorb the HC component which is discharged when the engine starts. The HC component that is released from the HC adsorbent is eliminated by a catalytic converter for oxidation (oxidation catalyst) which is provided on the downstream side of the HC adsorbent.

In general, at the start of the engine, the HC discharged as an unburned gas component of the fuel containing of various sizes of fuel particles. According to the principle of adsorption of the HC component by the exhaust emission control apparatus as mentioned above, the HC component collides with the HC component adsorbent which is provided on the downstream side, as viewed in the direction of the flow of the exhaust gas, due to the inertia, so that the HC component can be trapped. Consequently, when the exhaust gas passes through a bent portion of the exhaust passage formed at an intermediate portion thereof, the HC particles, and having a large specific gravity, separate from the exhaust gas owing to inertia and flow straight in the downstream direction together with a relatively small amount of exhaust gas. Consequently, the HC particles collide with the HC adsorbent provided downstream and are trapped thereby. Nevertheless, there is a possibility that the gaseous HC component contained in the exhaust gas is not subject to resistance in the HC adsorbent and accordingly is little adsorbed by the HC adsorbent, since the specific gravity of the gaseous HC component is low. Thus, the HC component flows into the oxidation catalyst on the downstream side.

SUMMARY OF THE INVENTION

The primary object of the present invention is to provide an improved exhaust emission control apparatus having an adsorbent opposed to an exhaust port, wherein the absorbability is enhanced.

To achieve the object mentioned above, according to the present invention, there is provided an exhaust emission control apparatus comprising a container body which is provided in an exhaust manifold of an engine and which defines therein adsorbent receiving compartments with openings that are opposed to exhaust ports of the corresponding cylinders of the engine, and adsorbents which are arranged in the respective adsorbent receiving compartments, wherein the adsorbents corresponding to the cylinders that are not adjacent to each other in terms of exhaust stroke order are interconnected at the ends thereof away from the openings by connecting gas passages to permit the exhaust gas to flow into the same.

The connecting gas passages can be made of metal pipes.

Preferably, the adsorbents corresponding to the cylinders that are not adjacent to each other in terms of exhaust stroke order are made integral.

The connecting gas passages can be integrally incorporated in the adsorbents. In this connection, the adsorbents having connecting gas passages incorporated therein are comprised of an assembly of corrugated plates and planar plates.

With the arrangement as mentioned above, at the start of the engine, i.e., at a low engine speed, such as during cranking, the exhaust gas which contains a large amount of HC consisting of large and small particles discharged from one exhaust port (first cylinder in which a first exhaust stroke occurs) collides with the adsorbent opposed to the exhaust port. Some of the small particles of the HC enter the connecting gas passage connected to the downstream end of the adsorbent. Since the connecting gas passage is not connected, at the other end thereof, to a second adsorbent which is opposed to a second cylinder in which a second exhaust stroke occurs, the HC which has entered the connecting gas passage is not forced back into the first adsorbent. Thus, the exhaust gas discharged from the first exhaust port can be easily introduced into the second adsorbent owing to an absence of a reverse flow of exhaust gas in the connecting gas passage. When the piston in the second cylinder, to which the second adsorbent is opposed, is in the exhaust stroke, the exhaust gas that remains in the connecting gas passage flows back into the first adsorbent due to the exhaust gas flowing into the connecting gas passage through the second adsorbent. However, when the exhaust gas again passes through the first adsorbent, the remaining HC contained in the exhaust gas can be adsorbed by the first adsorbent. Consequently, even small particles of HC can be effectively adsorbed by the adsorbent due to the flow of the exhaust gas as mentioned above, this resulting in an enhanced adsorbing efficiency of the adsorbent.

Moreover, a large amount of the HC component is discharged particularly during a cold start at which the temperature of the adsorbent is not sufficiently high, and accordingly, the release of the HC adsorbed by the adsorbent therefrom tends to be slow. Consequently, the HC component discharged from the exhaust port toward the adsorbent before the temperature of the oxidation catalyst reaches a predetermined reaction temperature can be certainly trapped and retained by the adsorbent. Thus, the amount of HC discharged into the air during a cold start can be remarkably reduced.

After the engine starts, i.e., after the starting operation is completed, the exhaust pressure of the exhaust gas discharged from the exhaust port becomes high, and consequently, the internal pressure in the adsorbent and the connecting gas passage increases. Consequently, the high temperature exhaust gas cannot enter the adsorbent due to the increased internal pressure, and then, the exhaust gas spontaneously flows into the oxidation catalyst whose pressure is substantially the same as the atmospheric pressure, located on the downstream side of the exhaust pipe. Therefore, the temperature of the adsorbent rises slowly to prevent the fast release of the HC from the adsorbent. Furthermore, when the temperature of the adsorbent rises due to the heat transfer from the exhaust gas, the release of the HC which has been trapped in the adsorbent, from the adsorbent, begins. Since there is a slight flow or movement of the exhaust gas in the connecting gas passage also after the engine starts, the HC remaining in the gas passage can be gradually discharged.

At the time of the occurrence of the release and discharge of the HC, the oxidation catalyst on the downstream side reaches the reaction temperature, and hence, the released HC can be quickly eliminated.

At a high engine load, since little or no high temperature exhaust gas flows through the adsorbent or the gas passage, an excess temperature rise of the adsorbent does not take place, this resulting in no breakage or damage thereof.

BRIEF DESCRIPTION OF THE DRAWINGS

The above and other objects, features, and advantages will be made more apparent from the ensuing description of the preferred embodiments in conjunction with the accompanying drawings wherein;

FIGS. 2A and 2B are a plan view and a front elevational view of an exhaust emission control apparatus according to a second embodiment of the present invention, respectively;

FIGS. 3A and 3B are a plan view and a front elevational view of an exhaust emission control apparatus according to a third embodiment of the present invention, respectively;

FIGS. 4A and 4B are a plan view and a front elevational view of an exhaust emission control apparatus according to a fourth embodiment of the present invention, respectively;

FIGS. 5A and 5B are a plan view and a sectional side view of an exhaust emission control apparatus according to a fifth embodiment of the present invention, respectively.

DESCRIPTION OF THE PREFERRED EMBODIMENT

Figures 1A, 1B:
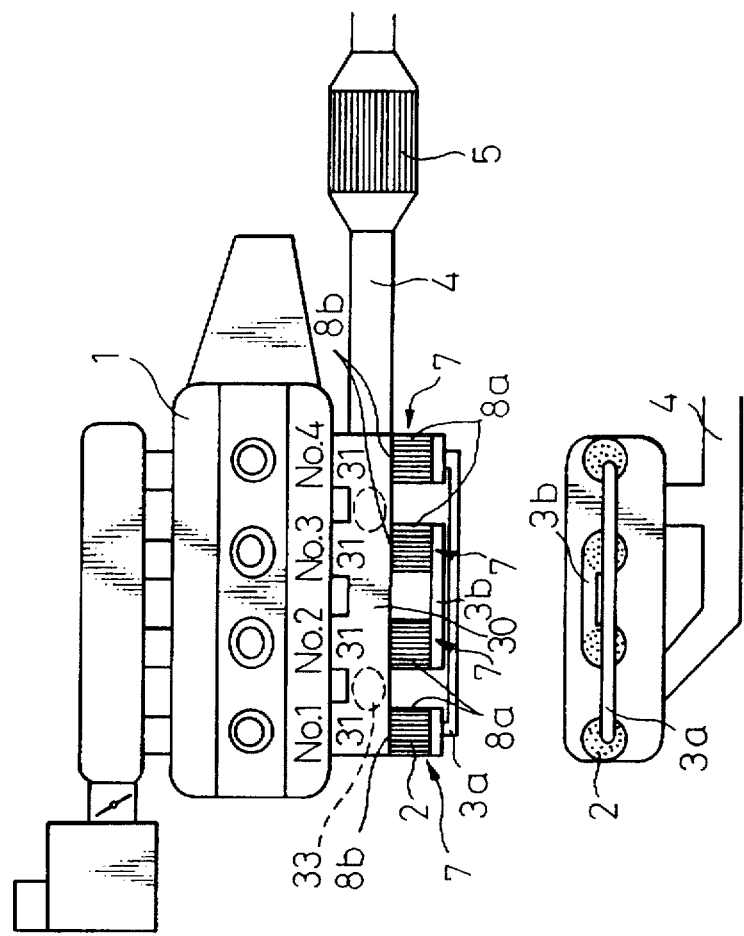
FIGS. 1A and 1B are a plan view and a front elevational view of an exhaust emission control apparatus according to a first embodiment of the present invention, respectively.
Figure 9:
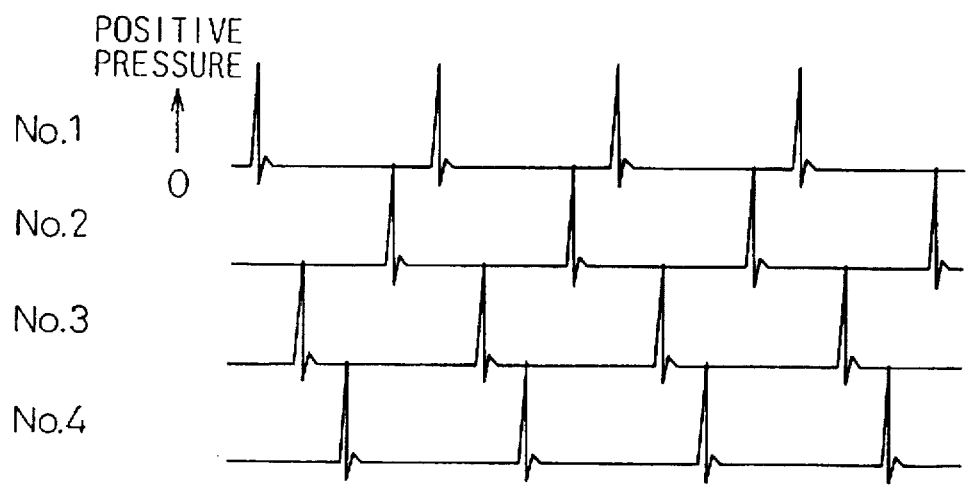

Referring to FIGS. 1A and 1B which show a first embodiment of the present invention, applied to an in-line four-cylinder engine by way of example, a container 7 is provided in or attached to an exhaust manifold 30 of the engine 1. The container 7 defines therein adsorbent receiving compartments 8a and is provided with inlet openings 8b of the adsorbent compartments that are opposed to corresponding exhaust port 31 of the cylinders No. 1 through No. 4. The inlet openings 8b open into the corresponding exhaust ports 31. The HC adsorbents 2 are accommodated in the respective adsorbent compartments 8a. The adsorbents 2 are each comprised of a honey-comb structure of ceramic or metal foil carrier which is coated with an adsorbent such as a zeolite. The HC adsorbents 2 are provided at the downstream ends thereof with connecting gas passage (connecting metal pipes) 3a and 3b. The connecting gas passage 3a (or 3b) connects the adsorbents 2 corresponding to the cylinders in which no exhaust stroke consecutively takes place. Namely, the adjacent adsorbents in terms of stroke order (not in the order of physical arrangement) are not interconnected. In the illustrated embodiment applied to the in-line four cylinder engine in which the exhaust stroke successively takes place in the order of the cylinder No. 1, No. 3, No. 4 and No. 2 (see FIG. 9), the connecting gas passage 3a connects the HC adsorbents 2 corresponding to the cylinder Nos. 1 and 4, and the connecting gas passage 3b connects the HC adsorbents 2 corresponding to the cylinder Nos. 1 and 3, respectively. The exhaust manifold 30 is connected through exhaust outlets 33 to an exhaust pipe 4 which is provided therein with an oxidation catalyst 5.

The exhaust emission control apparatus, as constructed according to the first embodiment, operates as follows.

In general, the exhaust stroke occurs in the order of the cylinder No. 1, No. 3, No. 4 and No. 2, as mentioned above.

Since the adjacent HC adsorbents 2 in the terms of stroke order are not interconnected, as mentioned above, the exhaust gas, which contains a large amount of HC consisting of large and small particles, is discharged, for example, from the exhaust port of the cylinder No. 1 during the starting of the engine, i.e., at a low engine speed such as during a cranking operation collides with the HC adsorbent 2 opposed to the exhaust port, and some of the small particles of HC flow into the connecting passage 3a through the adsorbent. It should be recalled here that the connecting passage 3a is connected to the adsorbent opposed to the exhaust port of the cylinder No. 4., and not to the adsorbent opposed to the exhaust port of the cylinder No. 3 in which the second exhaust stroke consecutively occurs following the first exhaust stroke of the cylinder No. 1. Consequently, during the second exhaust stroke, the HC which has entered the gas passage 3a through the adsorbent opposed to the exhaust port of the cylinder No. 1 is not forced back into the adsorbent. Hence, the exhaust gas discharged from the exhaust port of the cylinder No. 1 can be easily introduced in the associated adsorbent.

When the cylinder No. 4 changes to the exhaust stroke, the exhaust gas discharged from the exhaust port thereof flows into the adsorbent 2 opposed to the cylinder No. 4. Consequently, the HC existing in the connecting gas passage 3a is forced to flow back into the adsorbent opposed to the cylinder No. 1, by means of the exhaust gas flowing into the connecting passage 3a from the adsorbent opposed to the cylinder No. 4, and can be adsorbed again by the adsorbent. Hence, little HC is discharged outside through the adsorbent. As can be seen from the foregoing, according to the present invention, even small particles of HC, which can hardly be adsorbed in a conventional exhaust emission control apparatus, can be effectively adsorbed, this resulting in an enhanced absorbability.

In addition to the foregoing, as mentioned above, a large amount of the HC component is discharged particularly during cold starting when the temperature of the adsorbent is not sufficiently high, and accordingly, in general, the release of the HC adsorbed by the adsorbent therefrom takes place slowly. Consequently, the HC component discharged from the exhaust ports toward the adsorbents before the temperature of the oxidation catalyst reaches a predetermined reaction temperature can be certainly trapped and retained by the adsorbents. Thus, the amount of HC to be discharged in the air at the cold start can be remarkably reduced.

After the engine starts, i.e., after the starting operation is completed, the exhaust pressure of the exhaust gas discharged from the exhaust port becomes high, and consequently, the internal pressure of the adsorbent and the connecting gas passage increases. Consequently, the high temperature exhaust gas cannot enter the adsorbent due to the increased internal pressure, and then, the exhaust gas flows into the oxidation catalyst whose pressure is substantially the same as the atmospheric pressure, located on the downstream side of the exhaust pipe. Therefore, the temperature of the adsorbent rises slowly to prevent the fast release of the HC from the adsorbent. Furthermore, when the temperature of the adsorbent rises due to heat transfer from the exhaust gas, the release of the HC which has been trapped in the adsorbent from the adsorbent begins. The release phenomenon of the HC relies upon the inherent property of the adsorbent that the amount of HC to be adsorbed decreases as the temperature of the adsorbent increases. Therefore, the released HC can be quickly eliminated by the oxidation catalyst whose temperature reaches the reaction temperature when the HC begins to be released from the adsorbent. Furthermore, since there is a slight flow or movement of the exhaust gas in the connecting gas passage even after the engine starts, the HC remaining in the gas passage can be gradually discharged. The HC is adsorbed when it passes through the adsorbent if the temperature of the adsorbent is not so high that the release of the HC takes place, and then the adsorbed HC is released when the temperature becomes high enough to release the HC. At a high engine load, since there is no or little flow of high temperature exhaust gas in the adsorbents 2 or the connecting gas passages 3a and 3b, an excess temperature rise of the adsorbent does not take place, thus resulting in no breakage or damage thereof.

A second embodiment of the present invention, as applied to a in-line four-cylinder engine, will be discussed below with reference to FIGS. 2A and 2B. In the second embodiment, the adsorbents 2 opposed to the exhaust ports 31 of the cylinder No. 2 and No. 3 are integral. The operation of the second embodiment is substantially the same as that of the first embodiment but the arrangement or assembly of the adsorbents can be simplified in comparison with the first embodiment. In FIGS. 2A and 2B, the components corresponding to those in the first embodiment are designated with like numerals, and no redundant description thereof will be given herein. The same is true in other embodiments discussed hereinafter.

Note that the absorbents (referred to as additional adsorbents) are also provided in the portions of the container that are not opposed to the exhaust ports of the cylinders in the second embodiment. The additional adsorbents would contribute to an adsorption of HC components contained in the exhaust gas portion which is diverged from the main flow of the exhaust gas, thus resulting in an enhansment of the adsorption efficiency. Moreover, an integral assembly of the adsorbents including the additional adsorbents can be easily and conveniently attached to an engine. The above discussion can be equally applied to other embodiments as discussed below. A third embodiment of the present invention is illustrated in FIGS. 3A and 3B and is applied to an in-line six-cylinder engine. In the third embodiment, the exhaust stroke occurs in the order of cylinder No. 1, No. 5, No. 3, No. 6, No. 2 and No. 4. Accordingly, in this embodiment, the adsorbents 2 for the cylinder Nos. 1 and 6 are interconnected at the downstream ends thereof by the connecting gas passage 3a ; the adsorbents 2 for the cylinder Nos. 2 and 5 are interconnected at the downstream ends thereof by the connecting gas passage 3b ; and the adsorbents 2 for the cylinder Nos. 3 and 4 are interconnected at the downstream ends thereof by the connecting gas passage 3c, respectively. Namely, the adsorbents for the adjacent cylinders in terms of the stroke order are not interconnected.

A fourth embodiment of the present invention is illustrated in FIGS. 4A and 4B and is applied to a V type six-cylinder engine. In the fourth embodiment, the exhaust stroke occurs in the order of cylinder No. 1, No. 2, No. 3, No. 4, No. 5 and No. 6. Accordingly, in this embodiment, the adsorbents 2 for the even-number cylinders located on one bank, i.e., cylinder Nos. 2, 4 and 6 are interconnected by the connecting gas passage 3; and the adsorbents 2 for the odd-number cylinders located on the other bank, i.e., cylinder Nos. 1, 3 and 5 are interconnected by the connecting gas passage 3, respectively. This arrangement simplifies the structure of the apparatus.

Figure 5B:
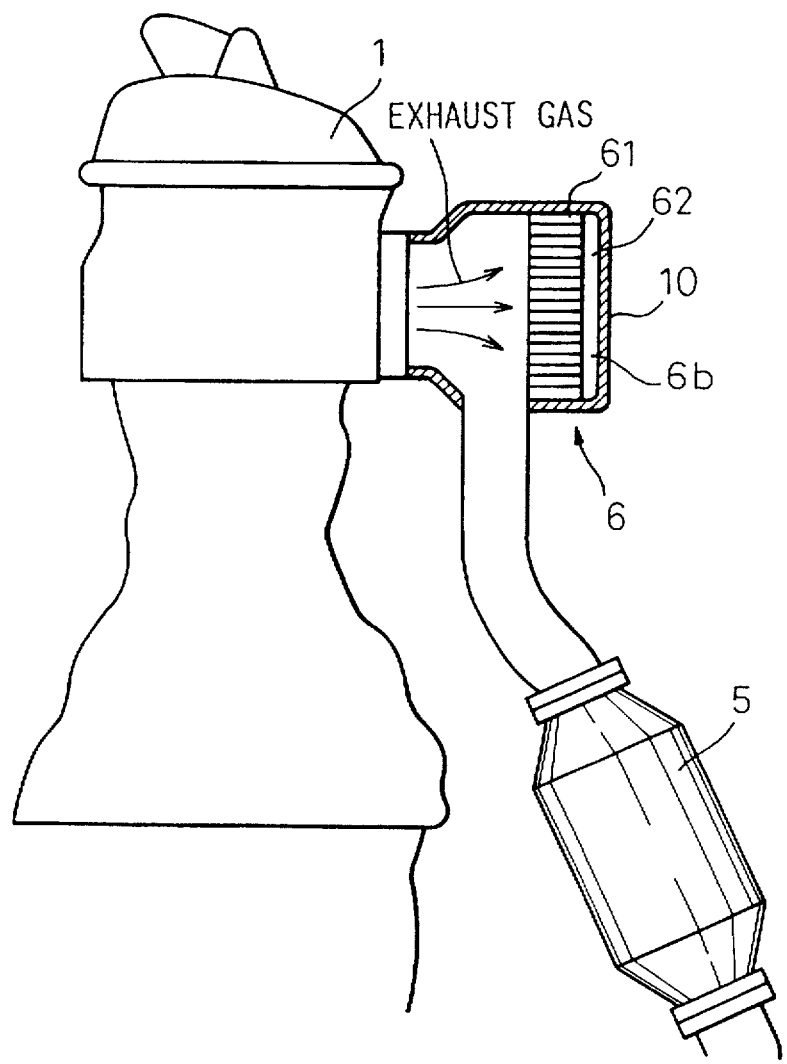
Figure 6:
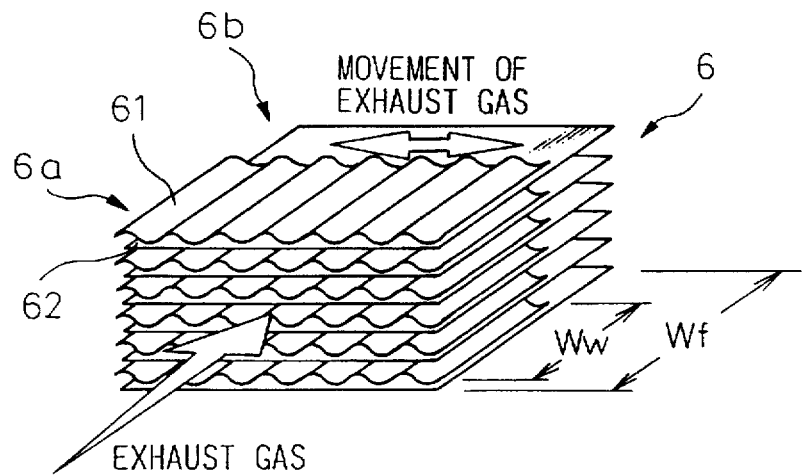
FIG. 6 is a perspective view of an adsorbent with a gas passage according to the fifth embodiment of the present invention.

FIG. 5 shows a fifth embodiment of the present invention in which the arrangement of the fourth embodiment is modified and improved. Namely, there is no connecting pipe to connect the adsorbents 2 shown in FIGS. 4A and 4B, in FIG. 5. Namely, the connecting gas passages are provided in the adsorbents 6 themselves, opposed to the exhaust ports of the cylinders. The adsorbents (assemblies) 6 with the connecting gas passages are comprised of corrugated plates 61, each being made of a stainless foil of for example 30 μm to 50 μm thickness, and planar plates 62 whose width Wf is different from the width Ww of the corrugated plates 61. The corrugated plates 61 and the planar plates 62 are alternately superimposed, as shown in FIG. 6. In the illustrated embodiment, the width Ww of the corrugated plates 61 is smaller than the width Wf of the planar plates 62 (Ww<Wf).

Thus, gas passages are defined behind the corrugated plates 61 at the rear end portions of the planar plates 62 due to the dimensional relationship of Ww<Wf as mentioned above. Consequently, the overlapped portions of the corrugated plates 61 and the planar plates 62 function as the HC adsorbents 6a, and the rear end portions of the planar plates 62 on which no corrugated plates 62 exist function as the gas passages 6b, respectively. Moreover, when the HC adsorbents (assemblies) 6 with the gas passages are attached to the exhaust manifold, the rear end portions of the planar plates 62 provided behind the corrugated plates 61 (i.e., the adsorbents 6a), i.e., the gas passages 6b come into contact with the wall 10 of the exhaust manifold 6 far from the associated engine. Consequently, the heat radiation efficiency can be enhanced thanks to the heat transfer to the atmosphere, thus leading to a slowing of the rise of the temperature of the HC adsorbents. Since the gas passages are integrally formed in the adsorbents (assemblies) 6, not only can the structure of the apparatus be simplified, but also the attachment thereof to the exhaust manifold can be facilitated. In addition to the foregoing, no large space is necessary for incorporating the adsorbents in the apparatus, thus resulting in a realization of a small exhaust emission control apparatus.

Figure 7A:
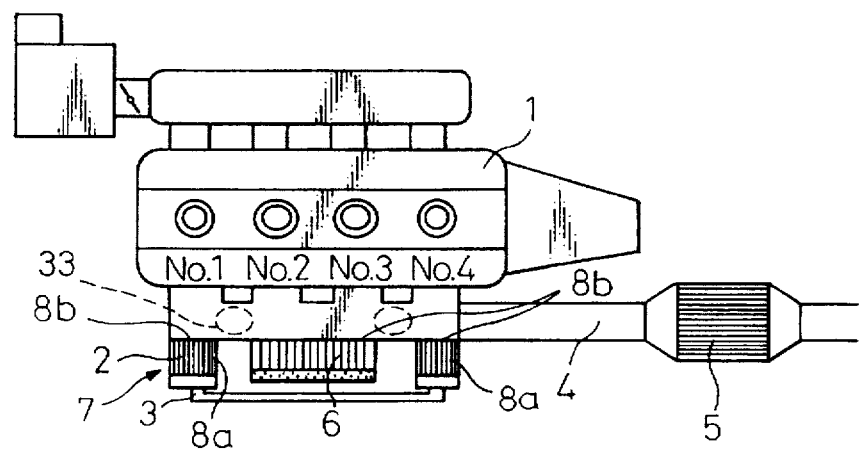
FIGS. 7A and 7B are a plan view and a front elevational view of an exhaust emission control apparatus according to a sixth embodiment of the present invention, respectively.
Figure 7B:
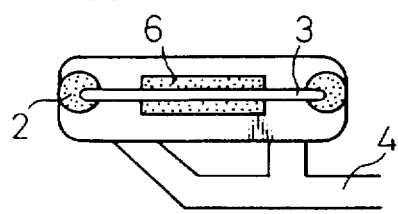

A third embodiment of the present invention illustrated in FIGS. 3A and 3B is applied to a in-line six-cylinder engine. In the third embodiment, the exhaust stroke occurs in the order of cylinder No. 1, No. 5, No. 3, No. 6, No. 2 and No. 4. Accordingly, in this embodiment, the adsorbents 2 for the cylinder Nos. 1 and 6 are interconnected at the downstream ends thereof by the connecting gas passage 3a ; the adsorbents 2 for the cylinder Nos. 2 and 5 are interconnected at the downstream ends thereof by the connecting gas passage 3b; and the adsorbents 2 for the cylinder Nos. 3 and 4 are interconnected at the downstream ends thereof by the connecting gas passage 3c, respectively. Namely, the adsorbents for the adjacent cylinders in terms of the stroke FIGS. 7A and 7B show a sixth embodiment of the present invention. In the sixth embodiment which is an improvement of the first or second embodiment, in which the adsorbents (assemblies) 6 shown in FIG. 6 are applied to a in-line four-cylinder engine. As can be seen in FIGS. 7A and 7B, the adsorbents 2 for the cylinder Nos. 2 and 3 shown in FIGS. 1A and 1B are replaced with one adsorbent (assembly) 6 with the gas passages as shown in FIG. 6. Accordingly, the technical effects and operations obtained from the first, second and fifth embodiments can be expected from the sixth embodiment.

Figures 8A, 8B:
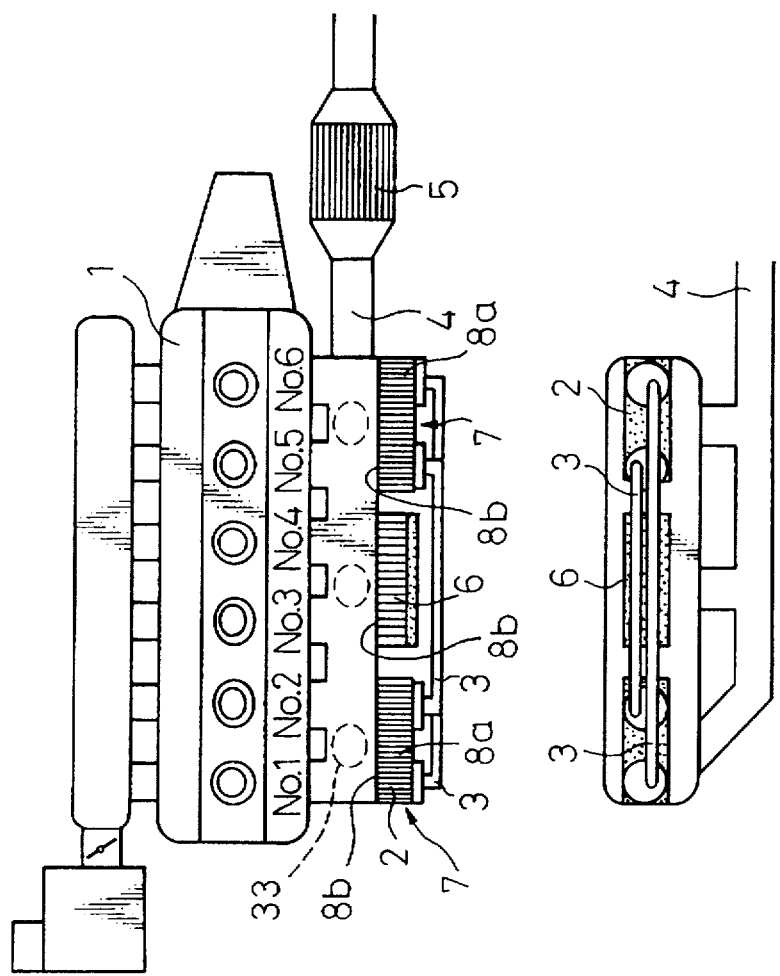
FIGS. 8A and 8B are a plan view and a front elevational view of an exhaust emission control apparatus according to a seventh embodiment of the present invention, respectively; and, FIG. 9 is a diagram of pressure pulsations in the course of exhaust strokes in a typical in-line four-cylinder engine.

FIGS. 8A and 8B show a seventh embodiment of the present invention which is an improved embodiment of the third embodiment, wherein the adsorbents (assemblies) 6 shown in FIG. 6 are applied to a in-line six-cylinder engine. In FIGS. 8A and 8B, the adsorbents 2 for the cylinder Nos. 3 and 4 shown in FIGS. 3A and 3B are replaced with one adsorbent (assembly) 6 with the gas passages as shown in FIG. 6. Accordingly, the technical effects and operations obtained from the first and fifth embodiments can be expected from the seventh embodiment.

As can be understood from the above discussion, according to the present invention, the following effects can be gained.

Since the adsorbents for the cylinders which are not adjacent to each other in terms of exhaust stroke order are interconnected through connecting gas passages, no reverse flow of the exhaust gas occurs during the entrance of the exhaust gas into the adsorbents, and hence, the exhaust gas can be easily introduced into the adsorbents, owing to the absence of the exhaust gas flowing from the opposite direction, and can easily enter the gas passages through the adsorbents. Thus, even the small particles of HC can be effectively adsorbed, thus resulting in an increased adsorption efficiency of the adsorbents.

Moreover, since the temperature of the adsorbents is not sufficiently high at the cold start, the release of the adsorbed HC from the adsorbents tends to be slow. Consequently, the HC components discharged before the temperature of the oxidation catalyst reaches the reaction temperature can be certainly trapped and retained, and thus, the amount of HC to be discharged into the air at the cold start can be remarkably reduced.

Moreover, if the gas passages are made of metal pipes, the structure can be simplified.

Furthermore, if the adsorbents for the cylinders that are not adjacent to each other in terms of stroke order are made integral, the arrangement of the adsorbents can be simplified in comparison with an arrangement in which the separate adsorbents are individually provided for the respective cylinders.

If the adsorbents (assemblies) with the gas passages incorporated therein are used, not only can the attachment of the apparatus be easily effected, but also the structure can be simplified, in comparison with the apparatus which is provided with the adsorbents and the separate connecting gas passages. Also, if the adsorbent assemblies do not need a large space for accommodation, the apparatus can be miniaturized as a whole.

If the adsorbent assembly is comprised of the corrugated plates and the planar plates, the gas passages come into contact with the wall surface of the exhaust manifold when the adsorbent assembly is attached to the exhaust manifold. Consequently, a heat radiation effect can be enhanced due to the heat transfer to the air, thus retarding the rise of the temperature of the HC adsorbent assembly.

Finally, it should be understood that many modifications and variations will occur to a person skilled in the art without departing from the spirit and scope of the accompanying claims.

What is claimed is:

1. An exhaust emission control apparatus comprising a container body which is provided in an exhaust manifold of an engine having a plurality of cylinders and which defines therein adsorbent receiving compartments with openings that are opposed to exhaust ports of the corresponding cylinders of the engine, and adsorbents which are arranged in the respective adsorbent receiving compartments, wherein the adsorbents corresponding to the cylinders that are not adjacent to each other,in terms of exhaust stroke order are interconnected at the ends thereof away from the openings by connecting gas passages to permit the exhaust gas to flow and enter the same.

2. An exhaust emission control apparatus according to claim 1, wherein said connecting gas passages are provided by metal pipes.

3. An exhaust emission control apparatus according to claim 1, wherein the adsorbents corresponding to the cylinders that are not adjacent to each other in terms of exhaust stroke order are made integral.

4. An exhaust emission control apparatus according to claim 1, wherein the connecting gas passages are integrally incorporated in the adsorbents.

5. An exhaust emission control apparatus according to claim 4, wherein the adsorbents having the connecting gas passages incorporated therein are comprised of an assembly of corrugated plates and planar plates.

* * * * *